(12) United States Patent
Chen et al.

(10) Patent No.: US 11,379,185 B2
(45) Date of Patent: Jul. 5, 2022

(54) MATRIX MULTIPLICATION DEVICE AND OPERATION METHOD THEREOF

(71) Applicant: NEUCHIPS CORPORATION, Hsinchu (TW)

(72) Inventors: Jian-Wen Chen, Kaohsiung (TW); Chiung-Liang Lin, Taichung (TW)

(73) Assignee: NEUCHIPS CORPORATION, Hsinchu (TW)

( * ) Notice: Subject to any disclaimer, the term of this patent is extended or adjusted under 35 U.S.C. 154(b) by 173 days.

(21) Appl. No.: 17/027,702

(22) Filed: Sep. 21, 2020

(65) Prior Publication Data

US 2022/0066736 A1 Mar. 3, 2022

(30) Foreign Application Priority Data

Aug. 25, 2020 (TW) .................................. 109128910

(51) Int. Cl.
*G06F 7/523* (2006.01)
*G06F 17/16* (2006.01)

(52) U.S. Cl.
CPC .............. *G06F 7/523* (2013.01); *G06F 17/16* (2013.01)

(58) Field of Classification Search
CPC .................................. G06F 7/523; G06F 17/16
USPC ........................................................ 708/520
See application file for complete search history.

(56) References Cited

U.S. PATENT DOCUMENTS

| | | | |
|---|---|---|---|
| 10,474,627 B2 | 11/2019 | Henry et al. | |
| 2017/0103301 A1 | 4/2017 | Henry et al. | |
| 2019/0042250 A1* | 2/2019 | Anders | G06F 17/16 |
| 2020/0285605 A1* | 9/2020 | Nam | G06F 9/30189 |
| 2021/0303358 A1* | 9/2021 | Zaidy | G06F 17/16 |
| 2021/0374509 A1* | 12/2021 | Liu | G06N 3/0454 |
| 2022/0036165 A1* | 2/2022 | Kwon | G06F 7/5443 |

FOREIGN PATENT DOCUMENTS

| | | |
|---|---|---|
| CN | 105849690 | 8/2016 |
| CN | 103902507 | 5/2017 |
| CN | 108446761 | 8/2018 |

(Continued)

OTHER PUBLICATIONS

"Office Action of Taiwan Counterpart Application", dated Jun. 28, 2021, p. 1-p. 4.

*Primary Examiner* — Tan V Mai

(74) *Attorney, Agent, or Firm* — JCIPRNET

(57) ABSTRACT

A matrix multiplication device and an operation method thereof are provided. The matrix multiplication device includes a plurality of unit circuits. Each of the unit circuits includes a multiplying-adding circuit, a first register, and a second register. A first input terminal and a second input terminal of the multiplying-adding circuit are respectively coupled to a corresponding first input line and a corresponding second input line. An input terminal and an output terminal of the first register are respectively coupled to an output terminal and a third input terminal of the multiplying-adding circuit. The second register is coupled to the first register to receive and temporarily store a multiplication accumulation result. Wherein, the second registers of the unit circuits output the multiplication accumulation results in a column direction in a first output mode, and output the multiplication accumulation results in a row direction in a second output mode.

11 Claims, 6 Drawing Sheets

(56) References Cited

FOREIGN PATENT DOCUMENTS

| | | |
|---|---|---|
| CN | 109062539 | 12/2018 |
| CN | 106599989 | 4/2019 |
| CN | 110427171 | 11/2019 |
| JP | 6571790 | 9/2019 |
| TW | 201802668 | 1/2018 |
| TW | 201905768 | 2/2019 |
| TW | I671689 | 9/2019 |

* cited by examiner

MATRIX MULTIPLICATION DEVICE AND OPERATION METHOD THEREOF

CROSS-REFERENCE TO RELATED APPLICATION

This application claims the priority benefit of Taiwan application serial no. 109128910, filed on Aug. 25, 2020. The entirety of the above-mentioned patent application is hereby incorporated by reference herein and made a part of this specification.

BACKGROUND

Technical Field

The disclosure relates to a computation circuit, and particularly relates to a matrix multiplication device and an operation method thereof.

Description of Related Art

In neural networks or other calculation techniques, it is generally required to perform multi-layer two-dimensional matrix multiplications and then perform one-dimensional vector operation. A systolic array structure may be used to perform the matrix multiplication operation. Input data and output data of the systolic array need to be arranged into a specific structure (order), so that it is required to use a multi-bank memory to provide the input data to the systolic array. In addition, additional hardware is required to process the alignment of the input data, so that the input data output by the multi-bank memory is provided to the systolic array in the specific structure (order). The output of the systolic array also needs to use a multi-bank first-in-first-out (FIFO) memory to store a partial sum. If the hardware for data alignment and the FIFO memory may be omitted, not only the hardware cost is reduced, but also efficiency of the matrix multiplication operation is enhanced.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a matrix multiplication device and an operation method thereof, so as to implement a matrix multiplication operation.

In an embodiment of the disclosure, the matrix multiplication device includes a plurality of first input lines, a plurality of second input lines and a plurality of unit circuits. Each of the unit circuits includes a multiplying-adding circuit, a first register, and a second register. A first input terminal and a second input terminal of the multiplying-adding circuit are respectively coupled to a corresponding first input line of the first input lines and a corresponding second input line of the second input lines. An input terminal and an output terminal of the first register are respectively coupled to an output terminal and a third input terminal of the multiplying-adding circuit. The second register is coupled to the first register to receive and temporarily store a multiplication accumulation result. Wherein, the second registers of the unit circuits output the multiplication accumulation results in a column direction in a first output mode, and the second registers of the unit circuits output the multiplication accumulation results in a row direction in a second output mode.

In an embodiment of the disclosure, the operation method includes: outputting the multiplication accumulation results by the second registers of the unit circuits in a column direction in a first output mode; and outputting the multiplication accumulation results by the second registers of the unit circuits in a row direction in a second output mode.

Based on the above description, the matrix multiplication device and the operation method thereof according to the embodiments of the disclosure adopt a multiplication accumulation array, where the multiplication accumulation array includes a plurality of unit circuits. In any one of the unit circuits, the first register may temporarily store a multiplication accumulation result of the multiplying-adding circuit and feed back the multiplication accumulation result to the multiplying-adding circuit. Based on the operations of the multiplying-adding circuits and the first registers of the unit circuits, the unit circuits may perform one batch of multiplication accumulation operations. When the unit circuits complete the one batch of multiplication accumulation operations, the second registers of the unit circuits may temporarily store the multiplication accumulation results of this batch, so that the unit circuits may immediately start a next batch of multiplication accumulation operations. The second registers of the unit circuits may selectively output the multiplication accumulation results in the column direction or the row direction to serve as a matrix multiplication operation result. Since the second registers may selectively output the multiplication accumulation results in the column direction or the row direction, the matrix multiplication device does not require additional hardware to process matrix transpose.

To make the aforementioned more comprehensible, several embodiments accompanied with drawings are described in detail as follows.

DESCRIPTION OF THE EMBODIMENTS

Figure 1:
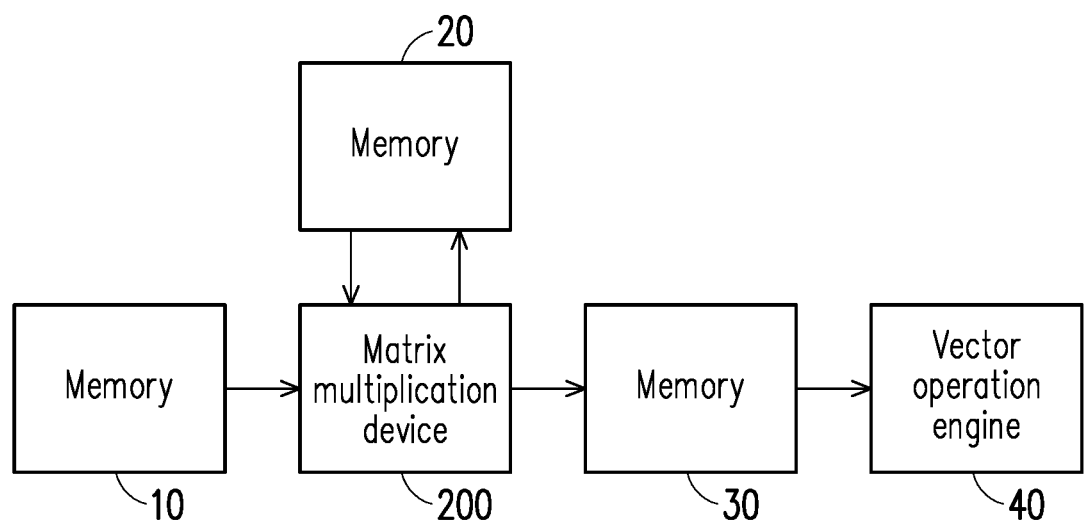
FIG. 1 is a circuit block schematic diagram of an electronic device according to an embodiment of the disclosure.

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. "first", "second", etc. mentioned in the specification (including the claims) are merely used to name different elements or distinguish between different embodiments or ranges, and should not be regarded as limiting the upper or lower bound of the number of the components, nor is it used to define a manufacturing order or setting order of the components. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a circuit block schematic diagram of an electronic device according to an embodiment of the disclosure. The electronic device shown in FIG. 1 includes a matrix multiplication device 200, a memory 10, a memory 20, and a memory 30. According to a design requirement, in some embodiments, the memory 10, the memory 20, and the memory 30 shown in FIG. 1 may be a same memory. In some other embodiments, the memory 10, the memory 20, and the memory 30 may be different memories.

The memory 10 is suitable for storing a first matrix W, and the memory 20 is suitable for storing a second matrix A. The matrix multiplication device 200 may read the first matrix W from the memory 10 and read the second matrix A from the memory 20. The matrix multiplication device 200 may perform a matrix multiplication operation (i.e., W*A) to generate a matrix multiplication operation result (a product matrix O). According to a requirement of an application operation, the matrix multiplication device 200 may choose to output the product matrix O to the memory 20 in a column direction, or choose to output the product matrix O to the memory 30 in a row direction. When the product matrix O is output to the memory 20, the product matrix O output to the memory 20 may be used as a multiplier of a next matrix multiplication operation, i.e., used as the second matrix A of the next matrix multiplication operation.

When the product matrix O is output to the memory 30, the product matrix O output to the memory 30 may be used as input data of a next-stage circuit (for example, a vector operation engine 40 or other circuits). In any case, the implementation of the disclosure should not be limited to the embodiment shown in FIG. 1. For example, according to a design requirement, the next-stage circuit may also use the product matrix O output to the memory 20. Based on the different output directions of the matrix multiplication device 200, in some application situations, the product matrix O output to the memory 20 may be regarded as a transposed matrix of the product matrix O output to the memory 30. Since the matrix multiplication device 200 may selectively output the product matrix O in the column direction or the row direction, the matrix multiplication device 200 does not require additional hardware to process matrix transpose.

Taking a neural network as an application example. In the neural network, it is generally necessary to perform multi-layer two-dimensional matrix multiplications and then perform one-dimensional vector operation. The matrix multiplication device 200 may perform the multi-layer two-dimensional matrix multiplications. The matrix multiplication device 200 may first output an operation result of the two-dimensional matrix multiplication of a previous layer to the memory 20 in the column direction to serve as a multiplier of the two-dimensional matrix multiplication of a next layer. In order to speed up an inference time of the neural network, the matrix multiplication device 200 may use a two-dimensional hardware structure composed of multiple multiplying-adding circuits to speed up the calculation. After completing the multi-layer two-dimensional matrix multiplications, the matrix multiplication device 200 may output a final operation result of the multi-layer two-dimensional matrix multiplications to the memory 30 in the row direction. The next-stage circuit (such as the vector operation engine 40 or other circuits) may read the final operation result from the memory 30 to perform the one-dimensional vector operation.

For the convenience of description, in the following embodiments, it is assumed that the first matrix W is an 8*32 matrix, the second matrix A is a 32*4 matrix, and a unit circuit array of the matrix multiplication device 200 is a 4*4 array. In any case, the embodiment of the disclosure is not limited thereto. Sizes of the first matrix W, the second matrix A, and/or the unit circuit array may be determined according to a design requirement. A following equation 1 illustrates a matrix multiplication operation of the first matrix W and the second matrix A. The matrix multiplication device 200 may multiply the first matrix W by the second matrix A to obtain the product matrix O (shown as the equation 1).

$$\begin{bmatrix} W_{1,1} & W_{1,2} & \ldots & W_{1,32} \\ W_{2,1} & W_{2,2} & \ldots & W_{2,32} \\ W_{3,1} & W_{3,2} & \ldots & W_{3,32} \\ W_{4,1} & W_{4,2} & \ldots & W_{4,32} \\ W_{5,1} & W_{5,2} & \ldots & W_{5,32} \\ W_{6,1} & W_{6,2} & \ldots & W_{6,32} \\ W_{7,1} & W_{7,2} & \ldots & W_{7,32} \\ W_{8,1} & W_{8,2} & \ldots & W_{8,32} \end{bmatrix} * \begin{bmatrix} A_{1,1} & A_{1,2} & A_{1,3} & A_{1,4} \\ A_{2,1} & A_{2,2} & A_{2,3} & A_{2,4} \\ \vdots & \vdots & \vdots & \vdots \\ A_{32,1} & A_{32,2} & A_{32,3} & A_{32,4} \end{bmatrix} = \qquad \text{Equation 1}$$

$$\begin{bmatrix} O_{1,1} & O_{1,2} & O_{1,3} & O_{1,4} \\ O_{2,1} & O_{2,2} & O_{2,3} & O_{2,4} \\ O_{3,1} & O_{3,2} & O_{3,3} & O_{3,4} \\ O_{4,1} & O_{4,2} & O_{4,3} & O_{4,4} \\ O_{5,1} & O_{5,2} & O_{5,3} & O_{5,4} \\ O_{6,1} & O_{6,2} & O_{6,3} & O_{6,4} \\ O_{7,1} & O_{7,2} & O_{7,3} & O_{7,4} \\ O_{8,1} & O_{8,2} & O_{8,3} & O_{8,4} \end{bmatrix}$$

Figure 2:
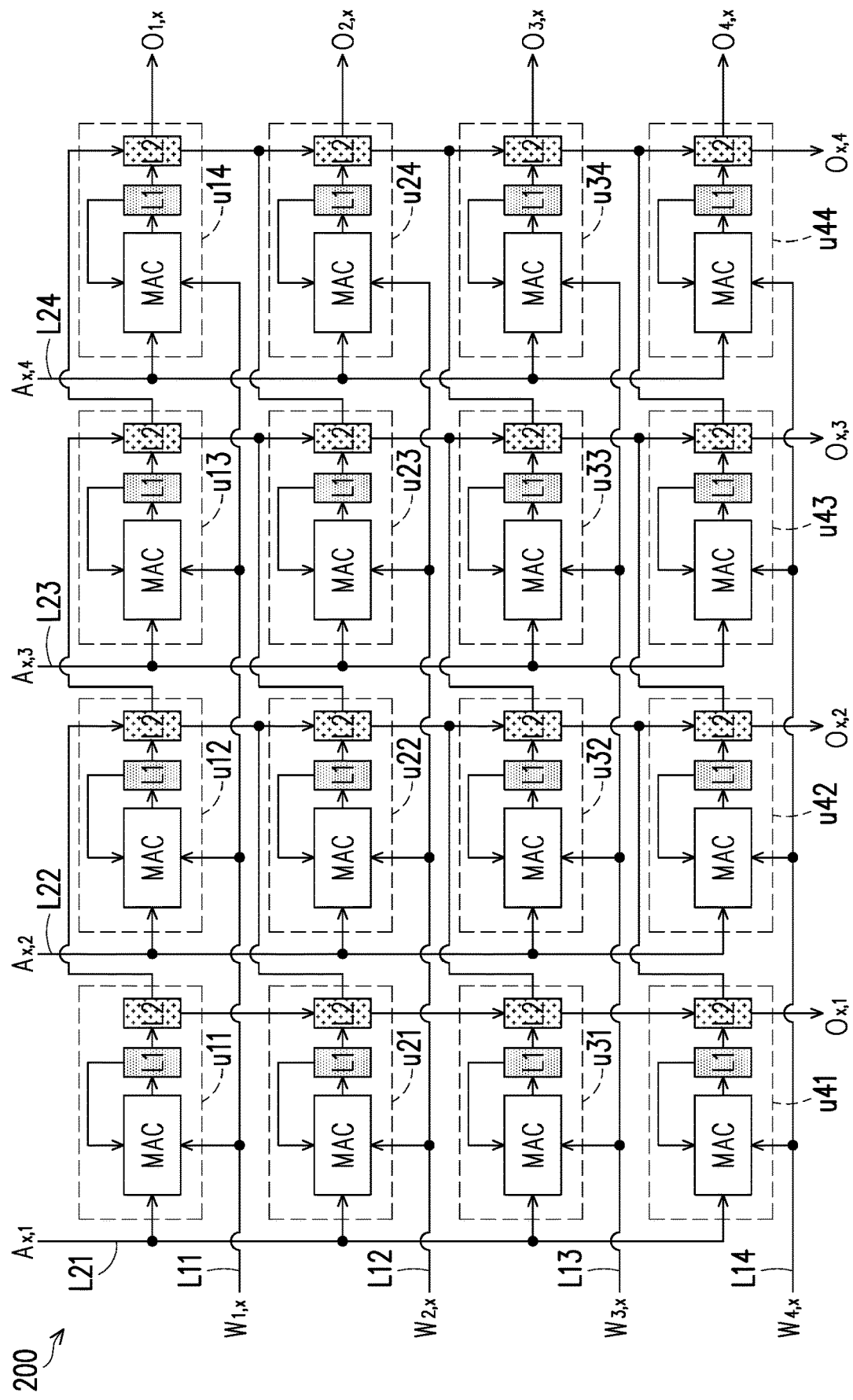
FIG. 2 is a circuit block schematic diagram of a matrix multiplication device shown in FIG. 1 according to an embodiment of the disclosure.

FIG. 2 is a circuit block schematic diagram of a matrix multiplication device 200 shown in FIG. 1 according to an embodiment of the disclosure. The matrix multiplication device 200 of FIG. 2 includes a plurality of first input lines (for example, input lines L11, L12, L13, and L14) and a plurality of second input lines (for example, input lines L21, L22, L23, and L24). Referring to FIG. 1 and FIG. 2, the input lines L11-L14 are coupled to the memory 10 to receive a part of (or all of) elements of a current column of the first matrix W. The input lines L21-L24 are coupled to the memory 20 to receive a part of (or all of) elements of a current row of the second matrix A.

Taking the first matrix W and the second matrix A shown in the equation 1 as an example, the matrix multiplication device 200 may complete the matrix multiplication operation shown in the equation 1 in two batches. The matrix multiplication device 200 may use an upper half of the first matrix W shown in the equation 1 and all of the second matrix A shown in the equation 1 to perform the matrix multiplication operation in a first batch, and use a lower half of the first matrix W shown in the equation 1 and all of the second matrix A shown in the equation 1 to perform the matrix multiplication operation in a second batch. Namely, in the first batch, elements $W_{1,x}$, $W_{2,x}$, $W_{3,x}$ and $W_{4,x}$ shown in FIG. 2 may be one of "$W_{1,1}$, $W_{2,1}$, $W_{3,1}$, $W_{4,1}$", "$W_{1,2}$, $W_{2,2}$, $W_{3,2}$, $W_{4,2}$", "$W_{1,32}$, $W_{2,32}$, $W_{3,32}$, $W_{4,32}$" of the first matrix W shown in the equation 1, and elements $A_{x,1}$, $A_{x,2}$, $A_{x,3}$ and $A_{x,4}$ shown in FIG. 2 may be one of "$A_{1,1}$, $A_{1,2}$, $A_{1,3}$, $A_{1,4}$", "$A_{2,1}$, $A_{2,2}$, $A_{2,3}$, $A_{2,4}$", . . . , "$A_{32,1}$, $A_{32,2}$, $A_{32,3}$, $A_{32,4}$" of the second matrix A shown in the equation 1. In the second batch, elements $W_{1,x}$, $W_{2,x}$, $W_{3,x}$ and $W_{4,x}$ shown in FIG. 2 may be one of "$W_{5,1}$, $W_{6,1}$, $W_{7,1}$, $W_{8,1}$", "$W_{5,2}$, $W_{6,2}$, $W_{7,2}$, $W_{8,2}$", "$W_{5,32}$, $W_{6,32}$, $W_{7,32}$, $W_{8,32}$" of the first matrix W shown in the equation 1, and elements $A_{x,1}$, $A_{x,2}$, $A_{x,3}$ and $A_{x,4}$ shown in FIG. 2 may be one of "$A_{1,1}$, $A_{1,2}$, $A_{1,3}$, $A_{1,4}$" to "$A_{32,1}$, $A_{32,2}$, $A_{32,3}$, $A_{32,4}$" of the second matrix A shown in the equation 1.

The matrix multiplication device 200 further includes a plurality of unit circuits, such as unit circuits u11, u12, u13, u14, u21, u22, u23, u24, u31, u32, u33, u34, u41, u42, u43 and u44 shown in FIG. 2. The unit circuits u11-u44 shown in FIG. 2 form a 4*4 unit circuit array. The input lines L11-L14 may broadcast the elements $W_{1,x}$, $W_{2,x}$, $W_{3,x}$ and $W_{4,x}$ to the unit circuits u11-u44. The input lines L21-L24 may broadcast the elements $A_{x,1}$, $A_{x,2}$, $A_{x,3}$ and $A_{x,4}$ to the unit circuits u11-u44. In any case, the implementation of the matrix multiplication device 200 shown in FIG. 1 should not be limited by the implementation shown in FIG. 2. The numbers of the unit circuits and the input lines of the matrix multiplication device 200 may be determined according to a design requirement.

Each of the unit circuits u11-u44 shown in FIG. 2 includes a multiplying-adding circuit MAC, a register L1, and a register L2. Taking the unit circuit u11 as an example, a first input terminal of the multiplying-adding circuit MAC is coupled to a corresponding input line (for example, the input line L11) of the input lines L11-L14. A second input terminal of the multiplying-adding circuit MAC is coupled to a corresponding input line (for example, the input line L21) of the input lines L21-L24. An output terminal of the register L1 is coupled to a third input terminal of the multiplying-adding circuit MAC to provide an old multiplication accumulation result. An input terminal of the register L1 is coupled to an output terminal of the multiplying-adding circuit MAC to receive a new multiplication accumulation result. The register L2 is coupled to the register L1 to receive and temporarily store the multiplication accumulation result. The other unit circuits u12-u44 shown in FIG. 2 may be deduced with reference to the relevant description of the unit circuit u11, and details thereof are not repeated.

Figure 3:
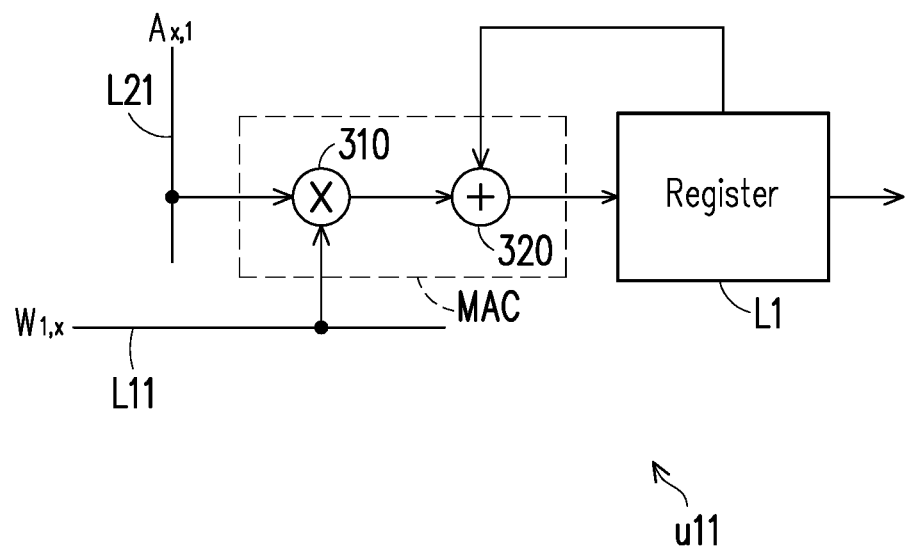
FIG. 3 is a circuit block schematic diagram of a multiplying-adding circuit of a unit circuit shown in FIG. 2 according to an embodiment of the disclosure.

FIG. 3 is a circuit block schematic diagram of the multiplying-adding circuit MAC of the unit circuit u11 shown in FIG. 2 according to an embodiment of the disclosure. The other unit circuits u12-u44 shown in FIG. 2 may be deduced with reference to the relevant description of the unit circuit u11 shown in FIG. 3, and details thereof are not repeated. The multiplying-adding circuit MAC of FIG. 3 includes a multiplier 310 and an adder 320. A first input terminal of the multiplier 310 is coupled to the corresponding input line (for example, the input line L11) of the input lines L11-L14. A second input terminal of the multiplier 310 is coupled to the corresponding input line L21 of the input lines L21-L24. A first input terminal of the adder 320 is coupled to an output terminal of the multiplier 310 to receive a product value of the element $W_{1,x}$ and the element $A_{x,1}$. A second input terminal of the adder 320 is coupled to the output terminal of the register L1 to receive the old multiplication accumulation result. An output terminal of the adder 320 is coupled to the input terminal of the register L1 to update the new multiplication accumulation result to the register L1.

In a period $T_1$, the input lines L11-L14 shown in FIG. 2 receive (read) the element values "$W_{1,1}$, $W_{2,1}$, $W_{3,1}$, $W_{4,1}$" of the first column ($W_{1,1}$ to $W_{8,1}$) of the first matrix W shown in the equation 1 from the memory 10 to serve as the elements $W_{1,x}$, $W_{2,x}$, $W_{3,x}$ and $W_{4,x}$ shown in FIG. 2, and the input lines L21-L24 shown in FIG. 2 receive (read) the element values "$A_{1,1}$, $A_{1,2}$, $A_{1,3}$, $A_{1,4}$" in the first row of the second matrix A shown in the equation 1 from the memory 20 to serve as the elements $A_{x,1}$, $A_{x,2}$, $A_{x,3}$ and $A_{x,4}$ shown in FIG. 2. The unit circuits u11-u44 respectively perform a multiplication accumulation operation on one of the elements $W_{1,x}$, $W_{2,x}$, $W_{3,x}$ and $W_{4,x}$ and one of the elements $A_{x,1}$, $A_{x,2}$, $A_{x,3}$ and $A_{x,4}$, and then respectively store the product values into the corresponding registers L1 (to serve as the multiplication accumulation results).

Then, in a period $T_2$, the input lines L11-L14 shown in FIG. 2 receive the element values "$W_{1,2}$, $W_{2,2}$, $W_{3,2}$, $W_{4,2}$" of the second column ($W_{1,2}$ to $W_{8,2}$) of the first matrix W shown in the equation 1 from the memory 10 to serve as the elements $W_{1,x}$, $W_{2,x}$, $W_{3,x}$ and $W_{4,x}$ shown in FIG. 2, and the input lines L21-L24 shown in FIG. 2 receive the element values "$A_{2,1}$, $A_{2,2}$, $A_{2,3}$, $A_{2,4}$" in the second row of the second matrix A shown in the equation 1 from the memory 20 to serve as the elements $A_{x,1}$, $A_{x,2}$, $A_{x,3}$ and $A_{x,4}$ shown in FIG. 2. The unit circuits u11-u44 respectively perform a multiplication accumulation operation on one of the elements $W_{1,x}$, $W_{2,x}$, $W_{3,x}$ and $W_{4,x}$ and one of the elements $A_{x,1}$, $A_{x,2}$, $A_{x,3}$ and $A_{x,4}$, and then respectively add the product values to the previous multiplication accumulation results to obtain new multiplication accumulation results, and store the new multiplication accumulation results into the corresponding registers L1.

Deduced by analogy, until the unit circuits u11-u44 complete the multiplication accumulation operations on the elements "$W_{1,32}$, $W_{2,32}$, $W_{3,32}$, $W_{4,32}$" and the elements "$A_{32,1}$, $A_{32,2}$, $A_{32,3}$, $A_{32,4}$" in a period $T_{32}$, the new multiplication accumulation results are then stored back to the registers L1 of the unit circuits u11-u44. At this time, the content of the registers L1 is an upper half of the product matrix O shown in the equation 1.

After the period $T_{32}$ is ended, a period $T_{33}$ is started. In the period $T_{33}$, the registers L1 of the unit circuits u11-u44 may flush the multiplication accumulation results to the registers L2 of the unit circuits u11-u44. In the period $T_{33}$, the input lines L11-L14 shown in FIG. 2 may receive the element values "$W_{5,1}$, $W_{6,1}$, $W_{7,1}$, $W_{8,1}$" of the first column ($W_{1,1}$ to $W_{8,1}$) of the first matrix W shown in the equation 1 from the memory 10 to serve as the elements $W_{1,x}$, $W_{2,x}$, $W_{3,x}$ and $W_{4,x}$ shown in FIG. 2, and the input lines L21-L24 shown in FIG. 2 may receive the element values "$A_{1,1}$, $A_{1,2}$, $A_{1,3}$, $A_{1,4}$" in the first row of the second matrix A shown in the equation 1 from the memory 20 to serve as the elements $A_{x,1}$, $A_{x,2}$, $A_{x,3}$ and $A_{x,4}$ shown in FIG. 2. The unit circuits u11-u44 perform the multiplication accumulation operations in the period $T_{33}$ to obtain new multiplication accumulation results, and update the new multiplication accumulation results to the registers L1 of the unit circuits u11-u44.

Deduced by analogy, the unit circuits u11-u44 complete multiplication accumulation operations of the elements "$W_{5,2}$, $W_{6,2}$, $W_{7,2}$, $W_{8,2}$" and the elements "$A_{2,1}$, $A_{2,2}$, $A_{2,3}$, $A_{2,4}$" in a period $T_{34}$, and the unit circuits u11-u44 complete multiplication accumulation operations of the elements "$W_{5,32}$, $W_{6,32}$, $W_{7,32}$, $W_{8,32}$" and the elements "$A_{32,1}$, $A_{32,2}$, $A_{32,3}$, $A_{32,4}$" in a period $T_{64}$, and then update the multiplication accumulation results to the registers L1 of the unit circuits u11-u44. At this time, the content of the registers L1 is a lower half of the product matrix O shown in the equation 1. In the period $T_{33}$ to the period $T_{64}$, the content flushed to the registers L2 may be sequentially shifted out in the row direction (a horizontal direction in FIG. 2) or the column direction (a vertical direction in FIG. 2).

After the period $T_{64}$ is ended, a period $T_{65}$ is started. In the period $T_{65}$, the registers L1 of the unit circuits u11-u44 may once again flush the multiplication accumulation results to the registers L2 of the unit circuits u11-u44. Therefore, after the period $T_{65}$ is ended, the content flushed to the registers L2 may be sequentially shifted out in the row direction or the column direction.

Figure 4:
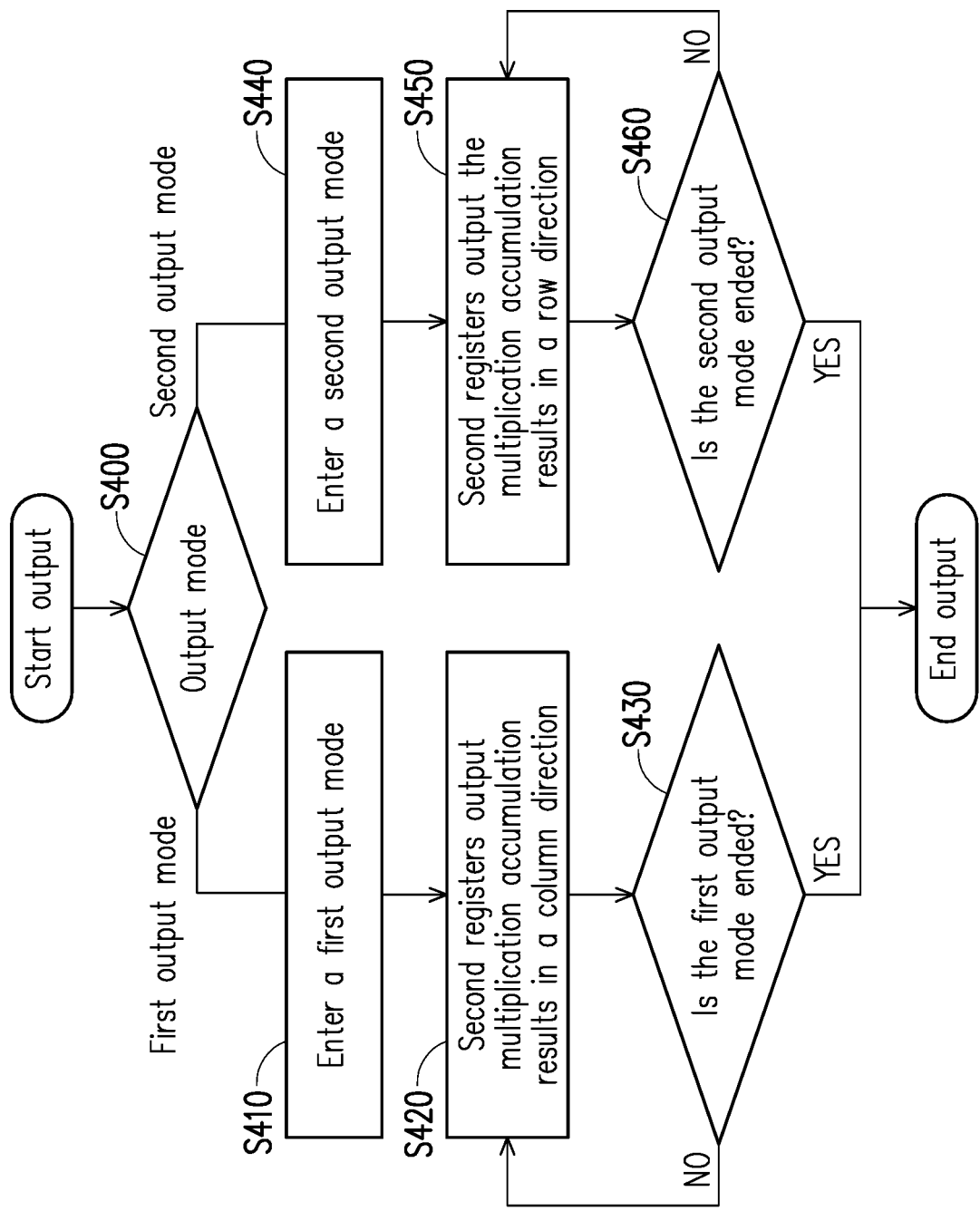
FIG. 4 is a flowchart illustrating an operation method of a matrix multiplication device according to an embodiment of the disclosure.

FIG. 4 is a flowchart illustrating an operation method of a matrix multiplication device according to an embodiment of the disclosure. In step S400, the matrix multiplication device 200 is selectively operated in one of a "first output mode" and a "second output mode" according to a requirement of an operating situation. Taking a neural network as an application example, in the neural network, it is generally required to perform multi-layer two-dimensional matrix multiplications and then perform one-dimensional vector operation. The matrix multiplication device 200 may be selectively operated in the "first output mode" during the period of performing the multi-layer two-dimensional matrix multiplications. After completing the multi-layer two-dimensional matrix multiplications, the matrix multiplication device 200 may be selectively operated in the "second output mode" for the next one-dimensional vector operation.

Referring to FIG. 1 to FIG. 4, in step S410, the matrix multiplication device 200 enters the "first output mode". In step S420, the unit circuits u11-u44 perform multiplication accumulation operations on the elements "$W_{1,x}$, $W_{2,x}$, $W_{3,x}$ and $W_{4,x}$" and the elements "$A_{x,1}$, $A_{x,2}$, $A_{x,3}$ and $A_{x,4}$" to produce multiplication accumulation results. The multiplication accumulation operations have been described in detail in the foregoing description with reference of the equation 1, so that detail thereof is not repeated. The registers L2 of the unit circuits u11-u44 output the multiplication accumulation results to the memory 20 in the column direction in the first output mode (step S420). Taking the neural network as an application example, when executing a hidden layer in a multilayer perceptron of the neural network, the registers L2 of the unit circuits u11-u44 output the multiplication accumulation results to the memory 20 in the column direction.

In the first output mode, the content flushed to the registers L2 is sequentially shifted out in the column direction (the vertical direction in FIG. 2). The registers L2 of the unit circuits in a same column are connected in series to form a shift register circuit. For example, as shown in FIG. 2, the registers L2 of the unit circuits u11, u21, u31 and u41 are connected in series to form a shift register circuit, the registers L2 of the unit circuits u12, u22, u32 and u42 are connected in series to form another shift register circuit, the registers L2 of the unit circuits u13, u23, u33 and u43 are connected in series to form still another shift register circuit, and the registers L2 of the unit circuits u14, u24, u34 and u44 are connected in series to form yet another shift register circuit. The elements $O_{x,1}$, $O_{x,2}$, $O_{x,3}$ and $O_{x,4}$ output by the shift register circuits are transferred to the memory 20. Therefore, the product matrix O shown in the equation 1 may be stored in the memory 20.

Figure 5:
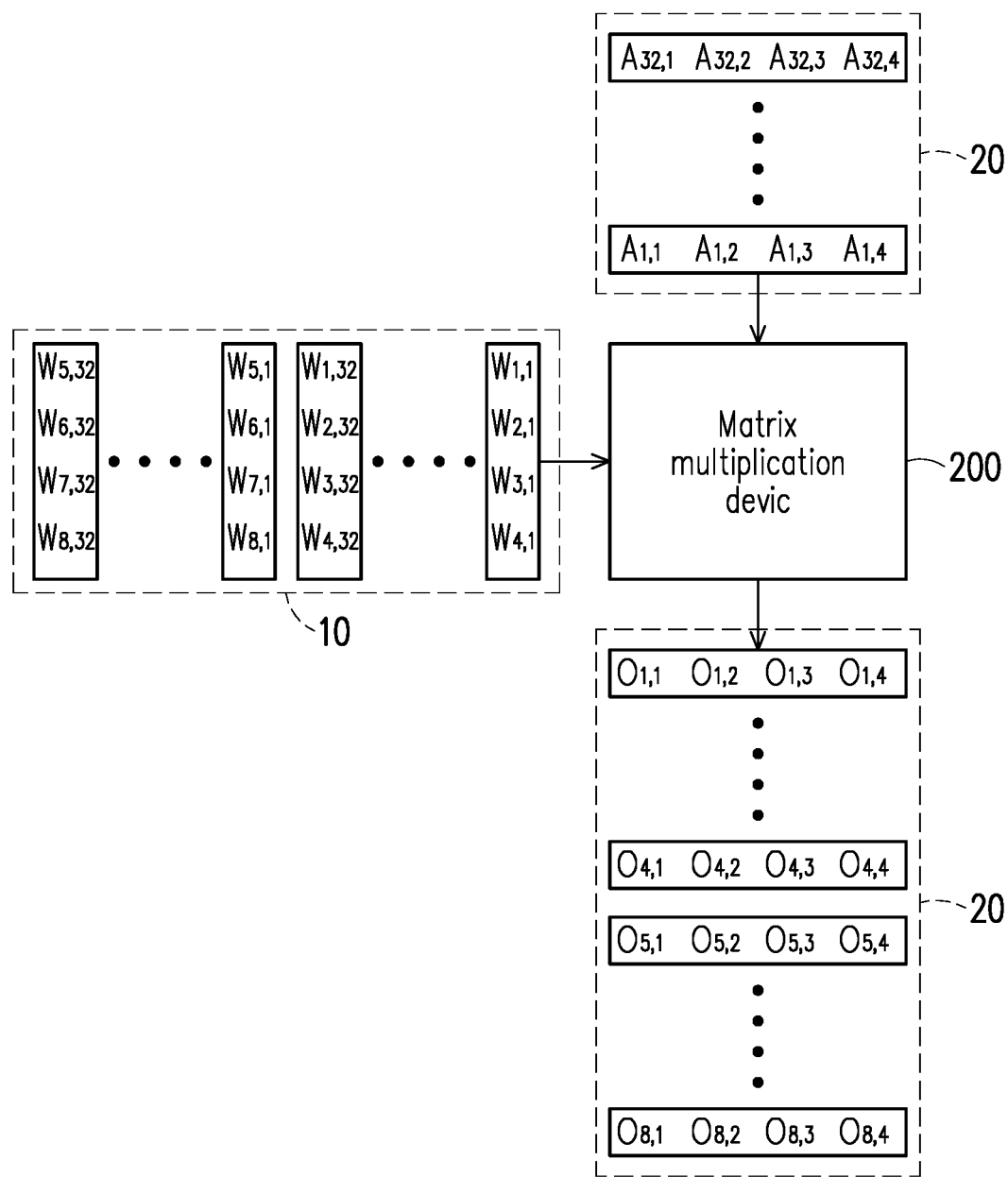
FIG. 5 is a schematic diagram illustrating input and output of the matrix multiplication device shown in FIG. 1 according to an embodiment of the disclosure.

FIG. 5 is a schematic diagram illustrating input and output of the matrix multiplication device 200 shown in FIG. 1 according to an embodiment of the disclosure. Referring to the equation 1, FIG. 1, FIG. 2 and FIG. 5, in the period $T_1$, the input lines L11-L14 receive (read) the elements "$W_{1,1}$, $W_{2,1}$, $W_{3,1}$, $W_{4,1}$" of the first column ($W_{1,1}$ to $W_{8,1}$) of the first matrix W from the memory 10 to serve as the elements $W_{1,x}$, $W_{2,x}$, $W_{3,x}$ and $W_{4,x}$ shown in FIG. 2, and the input lines L21-L24 receive (read) the elements "$A_{1,1}$, $A_{1,2}$, $A_{1,3}$, $A_{1,4}$" in the first row of the second matrix A from the memory 20 to serve as the elements $A_{x,1}$, $A_{x,2}$, $A_{x,3}$ and $A_{x,4}$ shown in FIG. 2. The unit circuits u11-u44 perform multiplication accumulation operations on the elements "$W_{1,1}$, $W_{2,1}$, $W_{3,1}$, $W_{4,1}$" and the elements "$A_{1,1}$, $A_{1,2}$, $A_{1,3}$, $A_{1,4}$". Deduced by analogy, in the period $T_{32}$, the input lines L11-L14 receive (read) the elements "$W_{1,32}$, $W_{2,32}$, $W_{3,32}$, $W_{4,32}$" of a $32^{nd}$ column ($W_{1,32}$ to $W_{8,32}$) of the first matrix W from the memory 10 to serve as the elements $W_{1,x}$, $W_{2,x}$, $W_{3,x}$ and $W_{4,x}$ shown in FIG. 2, and the input lines L21-L24 receive (read) the elements "$A_{32,1}$, $A_{32,2}$, $A_{32,3}$, $A_{32,4}$" in the $32^{nd}$ row of the second matrix A from the memory 20 to serve as the elements $A_{x,1}$, $A_{x,2}$, $A_{x,3}$ and $A_{x,4}$ shown in FIG. 2. The unit circuits u11-u44 perform multiplication accumulation operations on the elements "$W_{1,32}$, $W_{2,32}$, $W_{3,32}$, $W_{4,32}$" and the elements "$A_{32,1}$, $A_{32,2}$, $A_{32,3}$, $A_{32,4}$". After the period $T_{32}$ is ended, the period $T_{33}$ is started.

In the period $T_{33}$, the registers L1 of the unit circuits u11-u44 may flush the multiplication accumulation results to the registers L2 of the unit circuits u11-u44. After the period $T_{33}$ is ended, the content flushed to the registers L2 may be sequentially shifted out in the column direction. For example, the elements $O_{x,1}$, $O_{x,2}$, $O_{x,3}$, and $O_{x,4}$ shown in FIG. 2 are the elements $O_{4,1}$, $O_{4,2}$, $O_{4,3}$ and $O_{4,4}$ of the product matrix O shown in the equation 1 in the period $T_{34}$, the elements $O_{x,1}$, $O_{x,2}$, $O_{x,3}$, and $O_{x,4}$ shown in FIG. 2 are the elements $O_{3,1}$, $O_{3,2}$, $O_{3,3}$, and $O_{3,4}$ of the product matrix O shown in the equation 1 in a period $T_{35}$, the elements $O_{x,1}$, $O_{x,2}$, $O_{x,3}$ and $O_{x,4}$ shown in FIG. 2 are the elements $O_{2,1}$, $O_{2,2}$, $O_{2,3}$ and $O_{2,4}$ of the product matrix O shown in the equation 1 in a period $T_{36}$, and the elements $O_{x,1}$, $O_{x,2}$, $O_{x,3}$ and $O_{x,4}$ shown in FIG. 2 are the elements $O_{1,1}$, $O_{1,2}$, $O_{1,3}$ and $O_{1,4}$ of the product matrix O shown in the equation 1 in a period $T_{37}$.

In the period $T_{33}$, the input lines L11-L14 may receive the element values "$W_{5,1}$, $W_{6,1}$, $W_{7,1}$, $W_{8,1}$" of the first column ($W_{1,1}$ to $W_{8,1}$) of the first matrix W shown in the equation 1 from the memory 10 to serve as the elements $W_{1,x}$, $W_{2,x}$, $W_{3,x}$ and $W_{4,x}$ shown in FIG. 2, and the input lines L21-L24 may receive the element values "$A_{1,1}$, $A_{1,2}$, $A_{1,3}$, $A_{1,4}$" in the first row of the second matrix A shown in the equation 1 from the memory 20 to serve as the elements $A_{x,1}$, $A_{x,2}$, $A_{x,3}$ and $A_{x,4}$ shown in FIG. 2. The unit circuits u11-u44 perform the multiplication accumulation operations of the period $T_{33}$. Deduced by analogy, in the period $T_{64}$, the input lines L11-L14 receive (read) the element values "$W_{5,32}$, $W_{6,32}$, $W_{7,32}$, $W_{8,32}$" of the $32^{nd}$ column ($W_{1,32}$ to $W_{8,32}$) of the first matrix W from the memory 10 to serve as the elements $W_{1,x}$, $W_{2,x}$, $W_{3,x}$ and $W_{4,x}$ shown in FIG. 2, and the input lines L21-L24 receive (read) the element values "$A_{32,1}$, $A_{32,2}$, $A_{32,3}$, $A_{32,4}$" in the $32^{nd}$ row of the second matrix A from the memory 20 to serve as the elements $A_{x,1}$, $A_{x,2}$, $A_{x,3}$ and $A_{x,4}$ shown in FIG. 2. The unit circuits u11-u44 perform the multiplication accumulation operations of the period $T_{64}$. After the period $T_{64}$ is ended, the period $T_{65}$ is started.

In the period $T_{65}$, the registers L1 of the unit circuits u11-u44 may flush the multiplication accumulation results to the registers L2 of the unit circuits u11-u44. After the period $T_{65}$ is ended, the content flushed to the registers L2 may be sequentially shifted out in the column direction. For example, the elements $O_{x,1}$, $O_{x,2}$, $O_{x,3}$, and $O_{x,4}$ shown in FIG. 2 are the elements $O_{8,1}$, $O_{8,2}$, $O_{8,3}$ and $O_{8,4}$ of the product matrix O shown in the equation 1 in a period $T_{66}$, the elements $O_{x,1}$, $O_{x,2}$, $O_{x,3}$, and $O_{x,4}$ shown in FIG. 2 are the elements $O_{7,1}$, $O_{7,2}$, $O_{7,3}$, and $O_{7,4}$ of the product matrix O shown in the equation 1 in a period $T_{67}$, the elements $O_{x,1}$, $O_{x,2}$, $O_{x,3}$ and $O_{x,4}$ shown in FIG. 2 are the elements $O_{6,1}$, $O_{6,2}$, $O_{6,3}$ and $O_{6,4}$ of the product matrix O shown in the equation 1 in a period $T_{68}$, and the elements $O_{x,1}$, $O_{x,2}$, $O_{x,3}$ and $O_{x,4}$ shown in FIG. 2 are the elements $O_{5,1}$, $O_{5,2}$, $O_{5,3}$ and $O_{5,4}$ of the product matrix O shown in the equation 1 in a period $T_{69}$.

Referring to FIG. 2 and FIG. 4, in step S430, the matrix multiplication device 200 may determine whether the first output mode is ended. Taking the neural network as an application example, when the currently executed multiplication accumulation operation is a two-dimensional matrix multiplication operation of the hidden layer in the multilayer perceptron of the neural network, the matrix multiplication device 200 may determine that the first output mode has not yet ended (a determination result of step S430 is "No"), so that the matrix multiplication device 200 may be continually operated in the first output mode. When executing a final layer in the multilayer perceptron, the registers L2 of the unit circuits u11-u44 output the multiplication accumulation results to the memory 30 in the row direction. When the currently executed multiplication accumulation operation is a two-dimensional matrix multiplication operation of the final layer in the multilayer perceptron of the neural network, the matrix multiplication device 200 may determine that the first output mode has ended (the determination result of step S430 is "Yes"), so that the matrix multiplication device 200 is changed to the second output mode and starts to output the multiplication accumulation results in the row direction.

In step S440, the matrix multiplication device 200 enters the "second output mode". In step S450, the unit circuits u11-u44 perform the multiplication accumulation operations on the elements "$W_{1,x}$, $W_{2,x}$, $W_{3,x}$ and $W_{4,x}$" and the elements "$A_{x,1}$, $A_{x,2}$, $A_{x,3}$ and $A_{x,4}$" to produce the multiplication accumulation results. The multiplication accumulation operations have been described in detail in the foregoing description with reference of the equation 1, so that detail thereof is not repeated. The registers L2 of the unit circuits u11-u44 output the multiplication accumulation results to the memory 30 in the row direction in the second output mode (step S450). Taking the neural network as an application example, when executing the final layer in the multilayer perceptron of the neural network, the registers L2 of the unit circuits u11-u44 output the multiplication accumulation results to the memory 30 in the row direction.

In the second output mode, the content flushed to the registers L2 is sequentially shifted out in the row direction (the horizontal direction in FIG. 2). The registers L2 of the unit circuits in a same row are connected in series to form a shift register circuit. For example, as shown in FIG. 2, the registers L2 of the unit circuits u11, u12, u13 and u14 are connected in series to form a shift register circuit, the registers L2 of the unit circuits u21, u22, u23 and u24 are connected in series to form another shift register circuit, the registers L2 of the unit circuits u31, u32, u33 and u34 are connected in series to form still another shift register circuit, and the registers L2 of the unit circuits u41, u42, u43 and u44 are connected in series to form yet another shift register circuit. The elements $O_{1,x}$, $O_{2,x}$, $O_{3,x}$ and $O_{4,x}$ output by the shift register circuits are transferred to the memory 30. Therefore, the product matrix O shown in the equation 1 may be stored in the memory 30.

Figure 6:
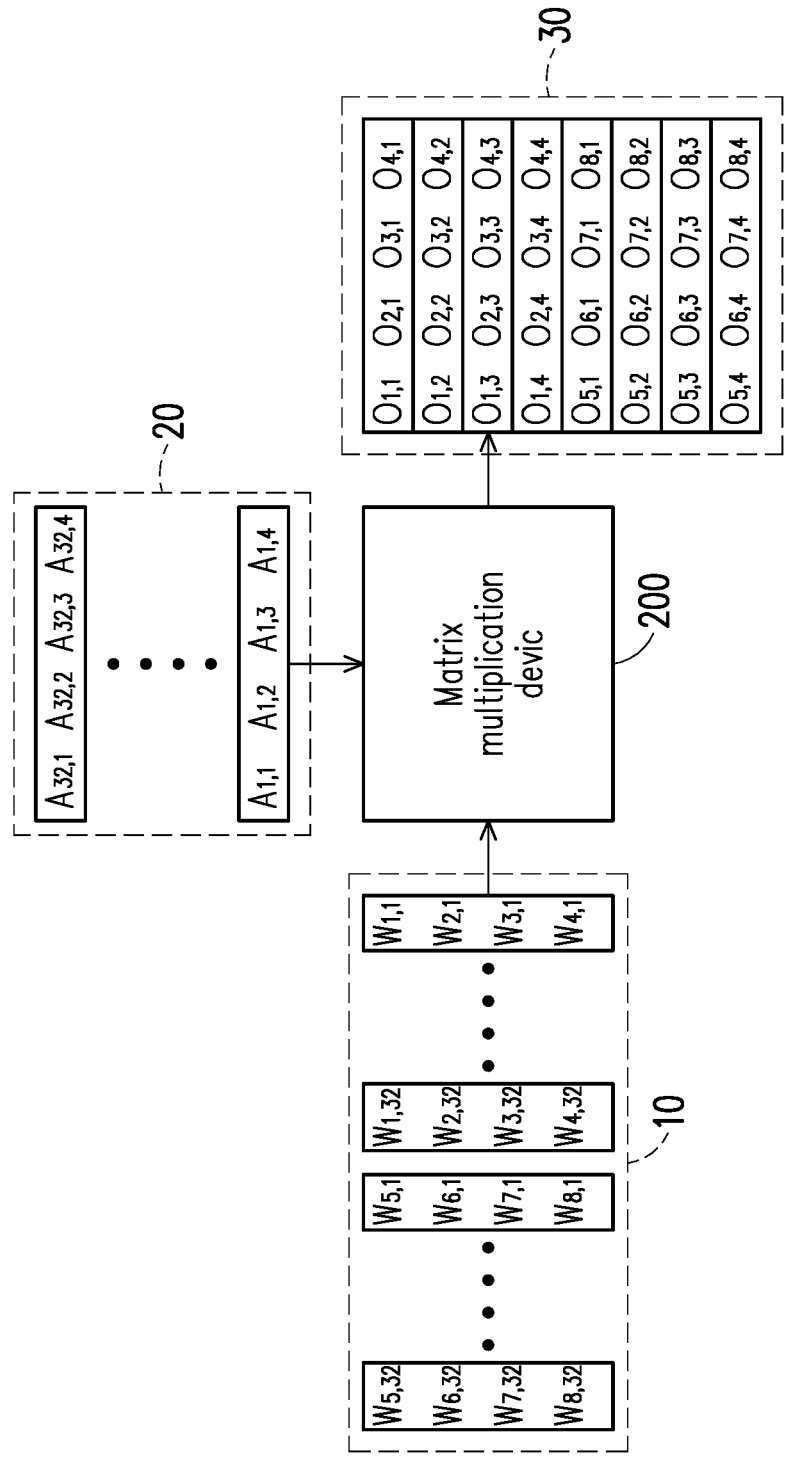
FIG. 6 is a schematic diagram illustrating input and output of the matrix multiplication device shown in FIG. 1 according to another embodiment of the disclosure.

FIG. 6 is a schematic diagram illustrating input and output of the matrix multiplication device 200 shown in FIG. 1 according to another embodiment of the disclosure. In the embodiment of FIG. 6, the matrix multiplication device 200 may also perform the multiplication accumulation operations of the period $T_1$ to the period $T_{32}$ (referring to the relevant description of the period $T_1$ to the period $T_{32}$ in the embodiment of FIG. 5 for details, which will not be repeated here). After the period $T_{32}$ is ended, the period $T_{33}$ is started. In the period $T_{33}$, the registers L1 of the unit circuits u11-u44 may flush the multiplication accumulation results to the registers L2 of the unit circuits u11-u44. After the period $T_{33}$ is ended, the content flushed to the registers L2 may be sequentially shifted out in the row direction. For example, the elements $O_{1,x}$, $O_{2,x}$, $O_{3,x}$ and $O_{4,x}$ shown in FIG. 2 are the elements $O_{1,4}$, $O_{2,4}$, $O_{3,4}$ and $O_{4,4}$ of the product matrix O shown in the equation 1 in the period $T_{34}$, the elements $O_{1,x}$, $O_{2,x}$, $O_{3,x}$, and $O_{4,x}$ shown in FIG. 2 are the elements $O_{1,3}$, $O_{2,3}$, $O_{3,3}$, and $O_{4,3}$ of the product matrix O shown in the equation 1 in the period $T_{35}$, the elements $O_{1,x}$, $O_{2,x}$, $O_{3,x}$, and $O_{4,x}$ shown in FIG. 2 are the elements $O_{1,2}$, $O_{2,2}$, $O_{3,2}$ and $O_{4,2}$ of the product matrix O shown in the equation 1 in the period $T_{36}$, and the elements $O_{1,x}$, $O_{2,x}$, $O_{3,x}$, and $O_{4,x}$ shown in FIG. 2 are the elements $O_{1,1}$, $O_{2,1}$, $O_{3,1}$ and $O_{4,1}$ of the product matrix O shown in the equation 1 in the period $T_{37}$.

In the embodiment of FIG. 6, the matrix multiplication device 200 may also perform the multiplication accumulation operations of the period $T_{33}$ to the period $T_{64}$ (referring to the relevant description of the period $T_{33}$ to the period $T_{64}$ in the embodiment of FIG. 5 for details, which will not be repeated here). After the period $T_{64}$ is ended, the period $T_{65}$ is started. In the period $T_{65}$, the registers L1 of the unit circuits u11-u44 may flush the multiplication accumulation results to the registers L2 of the unit circuits u11-u44. After the period $T_{65}$ is ended, the content flushed to the registers L2 may be sequentially shifted out in the row direction. For example, the elements $O_{1,x}$, $O_{2,x}$, $O_{3,x}$, and $O_{4,x}$ shown in FIG. 2 are the elements $O_{5,4}$, $O_{6,4}$, $O_{7,4}$ and $O_{8,4}$ of the product matrix O shown in the equation 1 in the period $T_{66}$, the elements $O_{1,x}$, $O_{2,x}$, $O_{3,x}$, and $O_{4,x}$ shown in FIG. 2 are the elements $O_{5,3}$, $O_{6,3}$, $O_{7,3}$, and $O_{8,3}$ of the product matrix O shown in the equation 1 in the period $T_{67}$, the elements $O_{1,x}$, $O_{2,x}$, $O_{3,x}$, and $O_{4,x}$ shown in FIG. 2 are the elements $O_{5,2}$, $O_{6,2}$, $O_{7,2}$ and $O_{8,2}$ of the product matrix O shown in the equation 1 in the period $T_{68}$, and the elements $O_{1,x}$, $O_{2,x}$, $O_{3,x}$, and $O_{4,x}$ shown in FIG. 2 are the elements $O_{5,1}$, $O_{6,1}$, $O_{7,1}$ and $O_{8,1}$ of the product matrix O shown in the equation 1 in the period $T_{69}$.

It may be seen from FIG. 5 and FIG. 6 that based on the different output directions of the matrix multiplication device 200, in some application situations, the product matrix O output to the memory 30 may be regarded as a transposed matrix of the product matrix O output to the memory 20. Since the matrix multiplication device 200 may selectively output the product matrix O in the column direction or the row direction, the matrix multiplication device 200 does not require additional hardware to process matrix transpose.

According to different design requirements, the blocks of the matrix multiplication device 200 may be implemented in hardware, firmware, software (i.e. program), or a combination thereof.

Referring to FIG. 2 and FIG. 4, in step S460, the matrix multiplication device 200 determines whether the second output mode is ended. When the matrix multiplication device 200 determines that the second output mode has not yet ended (a determination result of step S460 is "No"), the matrix multiplication device 200 may return to step S450 to continue being operated in the second output mode. When the matrix multiplication device 200 determines that the second output mode has ended (the determination result of step S460 is "Yes"), the matrix multiplication device 200 may end the output of the current matrix multiplication operation.

In terms of hardware, the blocks of the matrix multiplication device 200 described above may be implemented in a logic circuit on an integrated circuit. Related functions of the aforementioned matrix multiplication device 200 may be implemented as hardware by using hardware description languages (for example, Verilog HDL or VHDL) or other suitable programming languages. For example, the related functions of the matrix multiplication device 200 may be implemented in various logic blocks, modules and circuit in one or more controllers, microcontrollers, microprocessors, application-specific integrated circuits (ASICs), digital signal processors (DSPs), field programmable gate arrays (FPGAs) and/or other processing units.

In terms of software and/or firmware, the related functions of the matrix multiplication device 200 described above may be implemented as programming codes. For example, general programming languages (such as C, C++ or an assembly language) or other suitable programming languages are used to implement the matrix multiplication device 200. The programming codes may be recorded/stored in a recording medium. In some embodiments, the recording medium includes, for example, a read only memory (ROM), a random access memory (RAM), and/or a storage device. The storage device includes a hard disk drive (HDD), a solid-state drive (SSD) or other storage devices. In some other embodiments, the recording medium may include "a non-transitory computer readable medium". For example, a tape, a disk, a card, a semiconductor memory, a programmable logic circuit, etc., may be used to implement the non-transitory computer readable medium. A computer, a central processing unit (CPU), a controller, a microcontroller, or a microprocessor may read the programming codes from the recording medium and execute the same to realize the related functions of the matrix multiplication device 200 described above. Moreover, the programming codes may also be provided to the computer (or CPU) via any transmission medium (a communication network or a broadcast wave, etc.). The communication network is, for example, the Internet, a wired communication network, a wireless communication network, or other communication media.

In summary, the matrix multiplication device 200 and the operation method thereof according to the embodiments of the disclosure adopt a multiplication accumulation array, where the multiplication accumulation array includes a plurality of unit circuits u11-u44. In any one of the unit circuits u11-u44, the register L1 may temporarily store the multiplication accumulation result of the multiplying-adding circuit MAC and feed back the multiplication accumulation result to the multiplying-adding circuit MAC. Based on the operations of the multiplying-adding circuits MAC and the registers L1 of the unit circuits u11-u44, the unit circuits u11-u44 may perform one batch of multiplication accumulation operations. The "one batch of multiplication accumulation operations" is, for example, to perform the multiplication accumulation operations on the upper half of the first matrix W shown in the equation 1. When the unit circuits u11-u44 complete the one batch of multiplication accumulation operations, the registers L2 of the unit circuits u11-u44 may temporarily store the multiplication accumulation results of this batch, so that the unit circuits u11-u44 may immediately start a next batch of multiplication accumulation operations. The "next batch of multiplication accumulation operations" is, for example, to perform the multiplication accumulation operations on the lower half of the first matrix W shown in the equation 1. The registers L2 of the unit circuits u11-u44 may selectively output the multiplication accumulation results (a matrix multiplication operation result) in the column direction or the row direction. Since the registers L2 may selectively output the multiplication accumulation results in the column direction or the row direction, the matrix multiplication device 200 does not require additional hardware to process matrix transpose.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A matrix multiplication device, comprising:
   a plurality of first input lines;
   a plurality of second input lines; and
   a plurality of unit circuits, wherein each of the unit circuits comprises:
     a multiplying-adding circuit, having a first input terminal and a second input terminal respectively coupled to a corresponding first input line of the first input lines and a corresponding second input line of the second input lines;
     a first register, having an input terminal and an output terminal respectively coupled to an output terminal and a third input terminal of the multiplying-adding circuit; and
     a second register, coupled to the first register to receive and temporarily store a multiplication accumulation result,
   wherein the second registers of the unit circuits output the multiplication accumulation results in a column direction in a first output mode, and the second registers of the unit circuits output the multiplication accumulation results in a row direction in a second output mode.

2. The matrix multiplication device as claimed in claim 1, wherein the second registers of the unit circuits in a same column are connected in series to form a shift register circuit.

3. The matrix multiplication device as claimed in claim 1, wherein the second registers of the unit circuits in a same row are connected in series to form a shift register circuit.

4. The matrix multiplication device as claimed in claim 1, wherein the multiplying-adding circuit comprises:
   a multiplier, having a first input terminal and a second input terminal respectively coupled to the corresponding first input line of the first input lines and the corresponding second input line of the second input lines; and
   an adder, having a first input terminal and a second input terminal respectively coupled to an output terminal of the multiplier and the output terminal of the first register, wherein an output terminal of the adder is coupled to the input terminal of the first register.

5. The matrix multiplication device as claimed in claim 1, wherein
   when executing a hidden layer in a multilayer perceptron of a neural network, the second registers of the unit circuits output the multiplication accumulation results to a first memory in the column direction, and when executing a final layer in the multilayer perceptron, the second registers of the unit circuits output the multiplication accumulation results to a second memory in the row direction.

6. The matrix multiplication device as claimed in claim 1, wherein the second registers of the unit circuits output the multiplication accumulation results to a first memory to serve as a first product matrix in the column direction in the first output mode, and the second registers of the unit circuits output the multiplication accumulation results to a second memory to serve as a second product matrix in the row direction in the second output mode, and the first product matrix and the second product matrix are transposed matrices to each other.

7. An operation method of a matrix multiplication device, wherein the matrix multiplication device comprises a plurality of first input lines, a plurality of second input lines and a plurality of unit circuits, each of the unit circuits comprises a multiplying-adding circuit, a first register, and a second register, a first input terminal and a second input terminal of the multiplying-adding circuit are respectively coupled to a corresponding first input line of the first input lines and a corresponding second input line of the second input lines, an input terminal and an output terminal of the first register are respectively coupled to an output terminal and a third input terminal of the multiplying-adding circuit, and the second register is coupled to the first register to receive and temporarily store a multiplication accumulation result, the operation method comprising:

outputting the multiplication accumulation results by the second registers of the unit circuits in a column direction in a first output mode; and outputting the multiplication accumulation results by the second registers of the unit circuits in a row direction in a second output mode.

8. The operation method as claimed in claim 7, wherein the second registers of the unit circuits in a same column are connected in series to form a shift register circuit.

9. The operation method as claimed in claim 7, wherein the second registers of the unit circuits in a same row are connected in series to form a shift register circuit.

10. The operation method as claimed in claim 7, further comprising:

when executing a hidden layer in a multilayer perceptron of a neural network, outputting the multiplication accumulation results to a first memory by the second registers of the unit circuits in the column direction, and when executing a final layer in the multilayer perceptron, outputting the multiplication accumulation results to a second memory by the second registers of the unit circuits in the row direction.

11. The operation method as claimed in claim 7, wherein the second registers of the unit circuits output the multiplication accumulation results to a first memory to serve as a first product matrix in the column direction in the first output mode, and the second registers of the unit circuits output the multiplication accumulation results to a second memory to serve as a second product matrix in the row direction in the second output mode, and the first product matrix and the second product matrix are transposed matrices to each other.

\* \* \* \* \*